United States Patent [19]

Schoneveld et al.

[11] Patent Number: 5,511,062
[45] Date of Patent: Apr. 23, 1996

[54] LOOKING SLIDE DRIVE FOR A DISC SCANNER

[75] Inventors: Pieter A. Schoneveld, Eindhoven, Netherlands; Leo G. M. Metzemaekers, Vienna, Austria; Johannes T. A. Van De Veerdonk, Eindhoven, Netherlands; Robertus J. M. Verhoeven, Eindhoven, Netherlands; Cornelius A. Hezemans, Eindhoven, Netherlands; Petrus J. Blankers, Eindhoven, Netherlands; Johannes M. M. Hensing, Eindhoven, Netherlands; Cornelis M. Beijersbergen Van Henegouwen, Son, Netherlands

[73] Assignee: U.S. Philips Corporation, New York, N.Y.

[21] Appl. No.: 132,437

[22] Filed: Oct. 6, 1993

Related U.S. Application Data

[63] Continuation of Ser. No. 821,509, Jan. 15, 1992, abandoned.

[30] Foreign Application Priority Data

Apr. 8, 1991 [EP] European Pat. Off. ............. 91200808

[51] Int. Cl.$^6$ .................................................. G11B 7/085
[52] U.S. Cl. ........................................ 369/219; 369/249
[58] Field of Search ............................... 369/258, 215, 369/219, 220, 244, 249; 360/105

[56] References Cited

U.S. PATENT DOCUMENTS

| | | | |
|---|---|---|---|
| 2,520,290 | 8/1950 | Van Camp | 369/249 |
| 4,974,222 | 11/1990 | Ishitoya et al. | 369/215 |
| 4,999,530 | 3/1991 | Azuma et al. | 360/105 |
| 5,023,862 | 6/1991 | Kim | 369/215 |
| 5,025,437 | 6/1991 | Yamashita et al. | 360/105 |
| 5,058,097 | 10/1991 | Suzuki et al. | 369/215 |

FOREIGN PATENT DOCUMENTS 0357014A 3/1990 European Pat. Off. ..

OTHER PUBLICATIONS

European Search Report Jul. 23, 1992.

Primary Examiner—Stuart S. Levy
Assistant Examiner—Paul J. Ditmyer
Attorney, Agent, or Firm—David R. Treacy; Paul R. Miller

[57] ABSTRACT

An apparatus having a frame (1) carrying a turntable (3) for supporting the information carrier, which turntable is rotatable about an axis of rotation (3A), a slide (9), which is movable between two end positions, with a scanning unit, guide spindles (5, 7) and a linear motor unit (17, 19) for the slide, and an electrically energizable clamping unit (21). In the non-energized condition the clamping unit clamps the slide in any arbitrary stationary position of the slide along its path and in the energized condition it does not clamp the slide. During operation of the device a control unit at least substantially simultaneously turns on a first energizing current to the motor drive unit and a second energizing current to the clamping unit at the beginning of a displacement of the slide and at least substantially simultaneously turns off the first energizing current and the second energizing current at the end of the displacement.

20 Claims, 5 Drawing Sheets

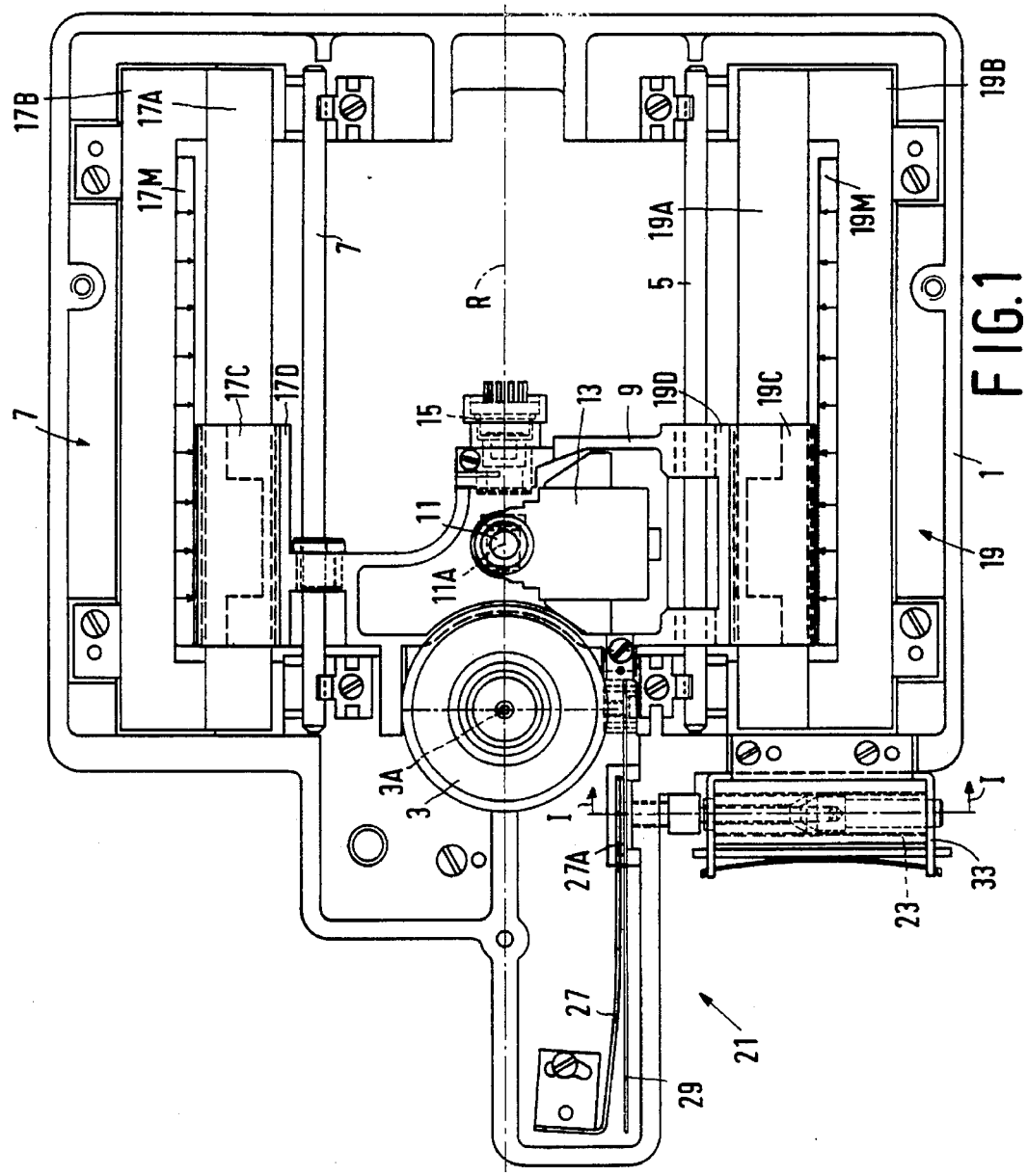
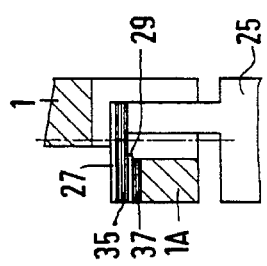
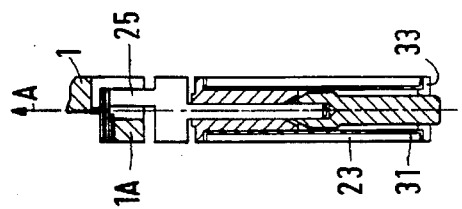
FIG.1
FIG.1B
FIG.1A

LOOKING SLIDE DRIVE FOR A DISC SCANNER

This is a continuation of application Ser. No. 07/821,509, filed Jan. 15, 1992 now abandoned.

BACKGROUND OF THE INVENTION

The invention relates to an apparatus or device for inscribing and/or reading a rotating disc-shaped information carrier, the device comprising a frame carrying a turntable for supporting the information carrier, which turntable is rotatable about an axis of rotation, a slide which is movable between two end positions and carries a scanning unit, in particular an optical unit, a guide means for the slide, in particular a rectilinear guide means, arranged on the frame, a linear motor unit having a stator section fixedly secured to the frame and an armature section fixedly secured to the slide, and a holding device for retaining the slide in an end position relative to the frame.

Such an apparatus or device is known from EP-A-0,328,022 (herewith incorporated by reference), to which U.S. Pat. No. 5,025,437 corresponds. The known device has a turnable for supporting an optically readable record carrier, which turntable is rotatably supported in a frame, a slide carrying an actuator and an objective, a linear motor with permanent magnet secured to the frame and an energizing coil secured to the slide, and a holding device constructed as a latching mechanism for the slide and comprising a solenoid and a pivotable hook-shaped latching element. The latching mechanism can latch the slide in only one position of the slide, i.e. the position nearest the turntable, the hook-shaped latching element then cooperating with a latching pin of the slide. The latching mechanism is intended as a protection means for the objective during transport.

In the known device the linear motor should be energized after every scan or interruption of a scanning process in order to move the slide from an arbitrary position to its latching position near the turntable. This may be a drawback. A further drawback is further that in the event of an unexpected power failure, for example when the batteries of a battery-powered apparatus become exhausted, the slide cannot be moved to its latching position, as a result of which the slide may perform uncontrolled movements which may give rise to serious damage particularly in the case of portable apparatuses.

SUMMARY OF THE INVENTION

It is an object of the in vention to provide an apparatus or device of the type defined in the opening paragraph which does not have said drawbacks and which, in addition, has a low power consumption during operation.

To this end the device in accordance with the invention is characterised in that the holding device comprises an electrically energizable clamping unit which in the non-energized condition clamps the slide, with the armature section of the linear motor unit fixedly secured thereto, in any arbitrary position of the slide along said path and in the energized condition does not clamp the slide and the armature section which is fixedly secured thereto, a control unit being provided which during operation of the device at least substantially simultaneously turns on a first energizing current to the motor unit and a second energizing current to the clamping unit at the beginning of a displacement of the slide along the guide means and which at least substantially simultaneously turns off the first energizing current and the second energizing current at the end of the displacement.

An advantage of the device in accordance with the invention is that in any stationary position the holding device retains the slide automatically relative to the frame both during operation and when idle, which results in a high immunity to shocks both in the operative and the inoperative condition. Moreover, in the inoperative condition an effective and reliable protection of the slide with the objective is obtained without additional measures being necessary to move the slide to a specific latching or blocking position. If desired, the clamping unit may be used as a brake.

A further advantage is that as a result of the presence of the holding device with the clamping unit and control unit the motor unit, in particular a linear drive unit, is powered by its control unit only during the movements of the slide, which leads to a substantial reduction of the power consumption, which is of particular importance in the case of battery powering. Moreover, if the device is in an oblique position during operation this does not require a continuous power consumption in order to compensate for the effect of gravity. In addition, the device in accordance with the invention is hardly susceptible to parasitic resonances in the construction owing to the absence of a control loop. During a search process, when the objective can be used to find the desired position, a displacement to be performed by the slide can be comparatively large.

The device in accordance with the invention is very suitable for use in an optical or magneto-optical player for recording and/or reproducing audio, video or data information. Such information is then stored in digital form in circular or quasi-circular tracks of the disc-shaped information carrier. The information carrier may be a CD or a similar disc such as a rewritable disc or a read-only disc in accordance with the ISO standard. Reading is effected by means of a focussed radiation beam.

In order to provide optimum starting conditions for the slide an embodiment of the device in accordance with the invention is characterised in that the control unit turns on the second energizing current before the first energizing current.

An embodiment using modern electronic devices is characterised in that the control unit comprises elements which determine the turn-on and turn-off instants for said energizing currents in dependence upon signals from a control system of the device. The control unit preferably forms pan of a control system which further comprises a controller for a 2D or 3D actuator of the scanning unit, the control unit being electrically connected to two power amplifiers which power the slide and the holding device respectively. The 2D actuator comprises a movable section carrying the objective, a stationary section and electromagnetic drive means. The movable section is movable relative to the stationary section in a focusing direction and a tracking direction.

A technically simple yet effectively operating embodiment is characterised in that the clamping unit comprises a solenoid secured to the frame and having a movable actuating element, a blade spring secured to the frame and cooperating with the actuating element, and a strip secured to the slide and extending between the solenoid and the blade spring and parallel to the path of the slide, the strip being clamped between the blade spring and the solenoid or a pan of the frame when the solenoid is not energized and the strip being clear of the solenoid, the frame and the blade spring when the solenoid is energized. In order to prevent the slide from being subjected to undesirable transverse forces during clamping of the strip the strip is preferably made of a flexible material, such as spring steel.

Another embodiment which performs effectively is characterised in that the clamping unit comprises a solenoid secured to the frame with an actuating mechanism and an elongate clamping element which is resiliently supported in the frame, which extends parallel to the path of the slide and which cooperates with the actuating mechanism, the clamping element being pressed against a contact portion of the slide when the solenoid is not energized and the clamping element being clear of the contact portion when the solenoid is energized. In order to increase the frictional force between the clamping element and the contact portion of the slide when the solenoid is not energized a side of the clamping element which faces the contact portion is provided with a lining, for example a rubber layer.

In a practical modification the above embodiment is characterised in that the actuating mechanism comprises a lever which is pivotable about a spindle secured to the frame and which is in contact with a central portion of the clamping element when the solenoid is energized.

Yet another effectively functioning embodiment is characterised in that the clamping unit comprises a magnetic circuit having a first circuit section comprising a permanent magnet with two mutually parallel elongate soft-magnetic parts extending parallel to the path of the slide and having a second circuit section comprising a coil which is situated between the soft-magnetic pans and comprises a core, one of the circuit sections being secured to the frame and the other circuit section to the slide and at least one of the soft-magnetic parts being clamped against an end surface of the core by magnetic attraction when the coil is not energized and both soft-magnetic pans being clear of the core when the coil is energized. In this embodiment the slide is blocked in the stationary condition by friction produced by means of magnetic forces of attraction. These forces of attraction are compensated while the coil is energized, so that the mechanical elements of the first circuit section and the mechanical elements of the second circuit section can move relative to one another without friction.

In a practical modification the embodiment mentioned in the last paragraph is characterised in that at least one of the soft-magnetic parts is a flexible strip. Preferably, the soft-magnetic pans are interconnected at one end by a non-magnetizable connecting element. In order to increase the friction a lining may be provided on the end surface of the core.

A further effectively operating embodiment is characterised in that the clamping unit comprises a piezoelectric element with a clamping actuator and with at least one clamping member, and a rod element, one of the elements being secured to the frame and the other element to the slide, the rod element being clamped by the clamping element when the clamping actuator is not energized and the rod element not being clamped by the clamping member when the clamping actuator is energized. If a voltage is applied across the piezoelectric clamping actuator the clamping actuator is subjected to a dimensional change which causes the slide to be unblocked.

In a practical modification the last-mentioned embodiment is characterised in that the rod element is of circular cross-section, the clamping member being coaxial with the rod element and being formed with clamping surfaces. Preferably, the piezoelectric element is secured to the slide and the rod element forms part of the guide means of the slide.

An embodiment which also performs effectively is characterised in that the clamping unit comprises a solenoid, which is secured to the frame and has a plunger to be driven by the solenoid, and a clamping element which is pivotably supported in the frame and which cooperates with the plunger, the clamping element being pivotable about a pivotal axis parallel to the path of the slide and the clamping element being pressed against a contact surface of the slide when the solenoid is not energized and the clamping element not being in contact with the contact surface when the solenoid is energized.

The invention will now be described in more detail, by way of example, with reference to the drawing.

BRIEF DESCRIPTION OF THE DRAWING

FIG. 1 is a plan view of a first embodiment of an apparatus or device in accordance with the invention, FIG. 1A is a sectional view taken on the line I—I in FIG. 1, FIG. 1B is an enlarged-scale sectional view taken on the line I—I in FIG. 1.

DESCRIPTION OF THE PREFERRED EMBODIMENT

Figure 2A:
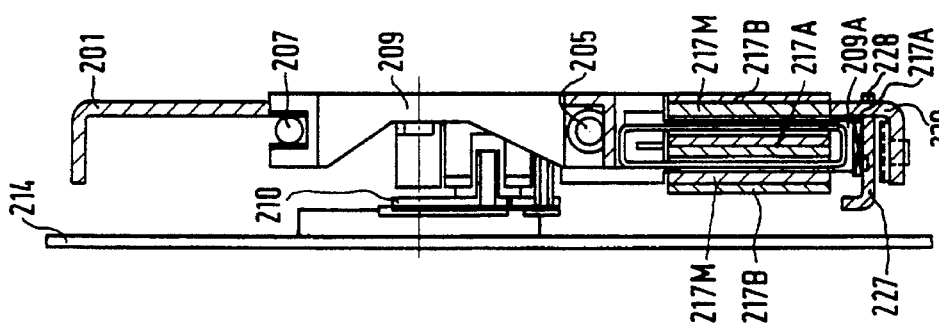
FIG. 2A is a sectional view taken on the line II—II in FIG. 2.

The apparatus or device in accordance with the invention shown in FIGS. 1, 1A and 1B comprises a frame 1 which supports a turntable 3 having a supporting surface for an optical or magneto-optical disc-shaped information carrier. The turntable is rotatable about an axis of rotation 3A and can be driven by an electric motor, not shown, which is supported in the frame. By means of two guide rods 5 and 7 a slide 9 is guided rectilinearly on the frame 1. The guide rods 5 and 7 extend parallel to one another and are oriented in such a manner that the slide 9 can describe a radial path R relative to the axis of rotation 3A between a position near the turntable and a position remote therefrom, which positions are related respectively to an inner track and an outer track of the information carrier. The slide 9 carries an optical unit comprising an objective 11 and an electromagnetic actuator 13 for driving the objective 11. Preferably, the electromagnetic actuator is of a 2D type, for example as described in the Netherlands Patent Application bearing the application number 9001492, to which co-pending U.S. application Ser. 07/622,044 corresponds (now U.S. Pat. No. 5,199,014, herewith incorporated by reference). Such an actuator comprises an objective-carrying section which is movable radially relative to the axis of rotation of the turntable by electromagnetic means, for example at least one magnet and at least one coil, which cooperates with the magnet via an air gap. The objective 11 serves for focusing a radiation beam from a radiation source, not shown, in particular a laser source, to form a radiation spot or a cluster of radiation spots in an information plane of the information carrier. For this purpose the objective-carrying section of the actuator is movable in the focusing direction, i.e. along the optical as is of the objective. Thus, the actuator 13 can move the objective along its optical axis 11A and in a radial direction relative to the axis of rotation 3A. In the present embodiment the radiation source is secured to the slide 9 and forms part of a light-detection grating unit 15. The radiation beam reaches the objective via a mirror unit, not shown.

At opposite sides the slide 9 is coupled to a linear motor 17 and 19 respectively. The motors 17 and 19, which are coupled to one another and together form the linear motor unit for the slide 9, comprise a stator section secured to the frame and an armature section fixedly secured to the slide. The stator section comprises a soft-magnetic yoke having a core 17A; 19A and a linkage portion 17B; 19B, and a permanent magnet 17M, 19M. The armature section comprises a coil 17C; 19C surrounding the core 17A; 19A and a coil holder 17D; 19D for securing the coil to the slide 9.

Figure 6:
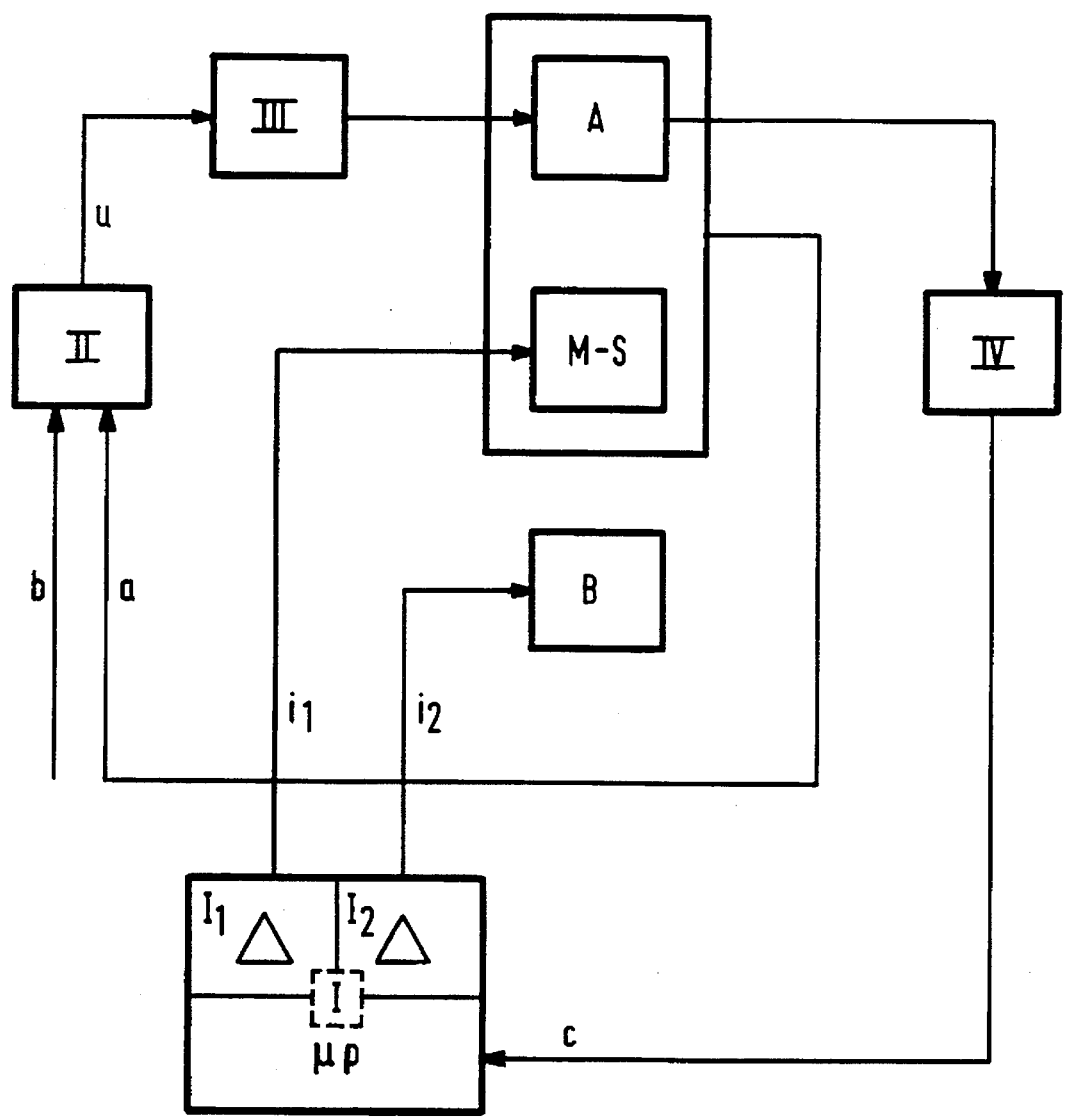
FIG. 6 shows diagrammatically a control system suitable for use in the embodiments shown.

The device shown in FIGS. 1, 1A and 12B further comprises a holding device comprising a clamping unit and a control unit, which will be described with reference to FIG. 6. The clamping unit 21 comprises a coil or solenoid 23, an actuating element 25 to be driven by the solenoid 23, a blade spring 27 and a strip 29. The solenoid is wound on a former 31 and accommodated in a magnetic yoke 33 secured to the frame 1. When the solenoid is energized by a voltage source the electromagnetic forces then produced cause the actuating element to perform an axial movement as indicated by the arrow A, a free end portion 27A of the blade spring 27, which is adjustably secured to the frame, being moved over a small distance.

In the non-energized condition of the solenoid 23 the strip 29 secured to the slide 9 is resiliently clamped between the blade spring 27 and a frame portion 1A of the frame 1. However, in the energized condition of the solenoid 23 the free end portion 27A of the blade spring is situated so far from the frame portion 1A that the strip 29 is in a free condition between the blade spring 27 and the frame 1. In this condition the slide 9 is movable over the guide rods 5 and 7. As the strip 29 extends parallel to the guide rods 5 and 7 and has a length corresponding to the maximum travel of the slide 9 the strip 29 can be clamped in any position of the slide 9 and, as a consequence, the slide can be retained in any arbitrary position. In order to achieve an optimum clamping the end portion 27A and the frame portion 1A are preferably provided with a high-friction lining 35 and 37 respectively.

Figure 2:
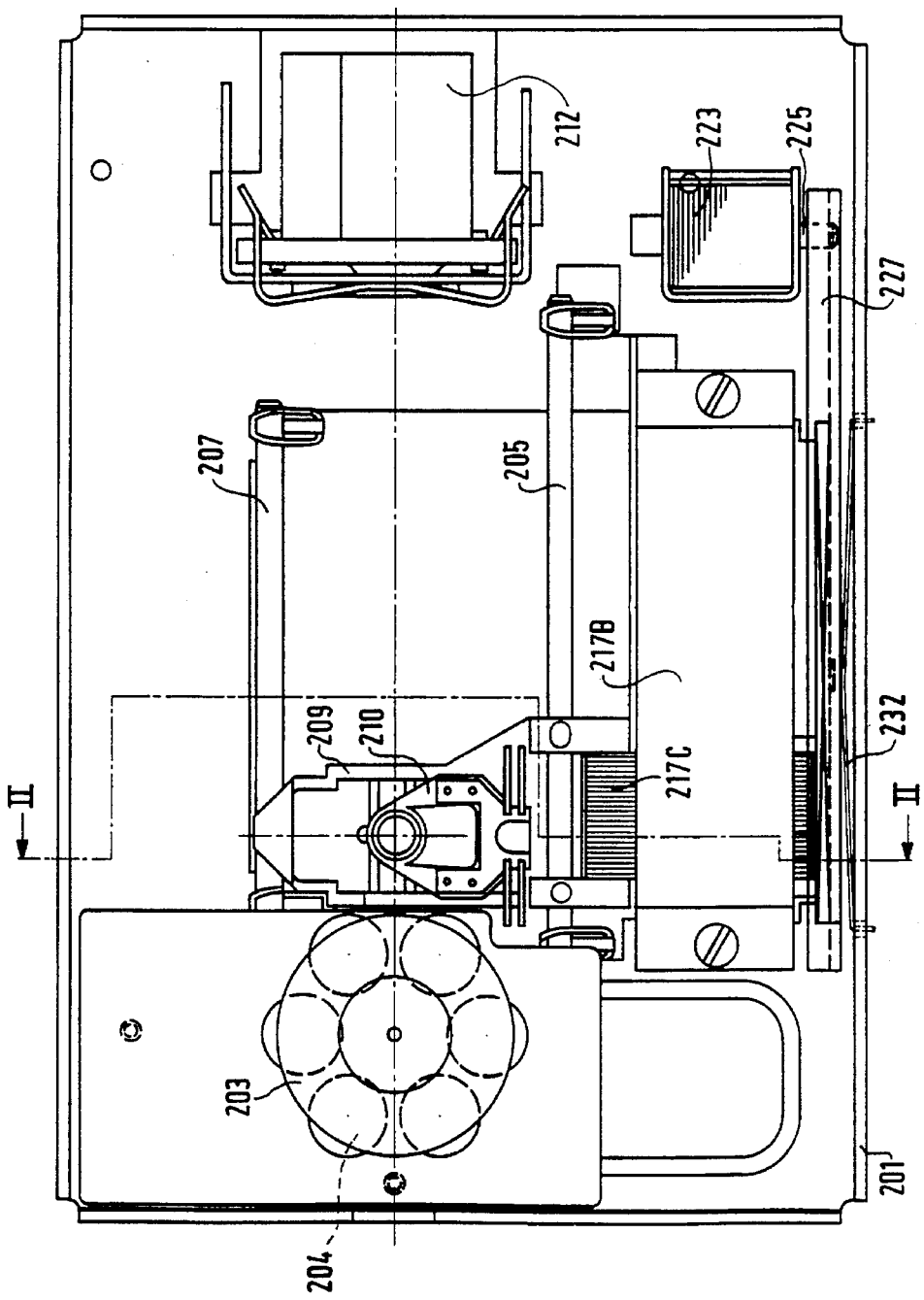
FIG. 2 is a plan view of a second embodiment.

The device in accordance with the invention shown in FIGS. 2 and 2A comprises a frame 201 with a turntable 203 which can be rotated by an electric motor 204 mounted in the frame. Two guide spindles 205 and 207 are secured to the frame 201 for the rectilinear guidance of a slide 209 between two end positions, which slide carries a scanning unit 210. The scanning unit comprises inter alia an objective and a 2D and 3D actuator for driving the objective. A laser source 2 12 mounted on the frame generates a radiation beam by means of which an optical information carrier 214 placed on the rotating turntable can be scanned in a manner known per se.

The device shown in FIGS. 2 and 2A further comprises a linear motor 217 for driving the slide 209 and a holding device for holding the slide 209 in any position situated between the two end positions. The linear motor 217 comprises a stator section secured to the frame 201 and comprising two permanent magnets 217M, a double core 217A of a soft-magnetic material and two linkage plates 217B. The linear motor 217 further comprises an armature section secured to the slide 209 and having a coil 217C extending between the core 217A and the magnets 217M. The holding device has a clamping unit 221 comprising a solenoid 223, which is secured to the frame 201 and has a plunger 225, and a clamping element 227. The clamping element 227 is secured to the frame 201 so as to be pivotable by means of a hinge construction. The hinge construction may comprise hinges or, as in the present embodiment, two pins 228 engaging in recesses 230 in the frame. When the solenoid is not energized the clamping element 227 is continuously urged against a contact surface 209A of the slide 209 by a spring force which, in the present example, is provided by a pressure spring 232, thereby precluding a movement of the slide. In order to increase the friction the clamping element 227 is provided with a suitable lining 227A. When the solenoid 223 is energized the plunger 225 is moved out of the solenoid, which causes a pivotal movement about the two pins 228, i.e. about a line parallel to the guide spindles 205 and 207, as result of which the clamping element 227 is moved away from the contact surface 209A, enabling the slide to be moved.

Figure 3:
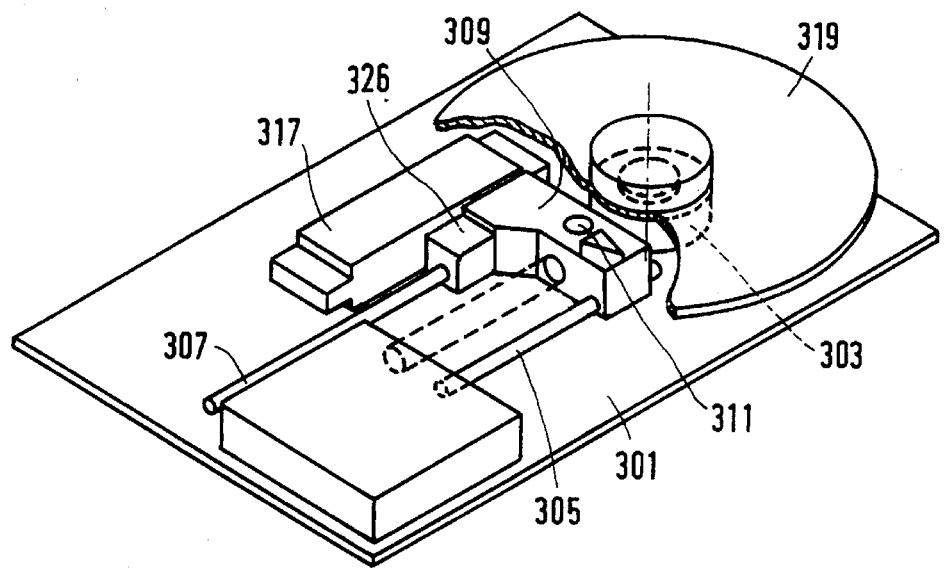
FIG. 3 shows diagrammatically a third embodiment.
Figure 3A:
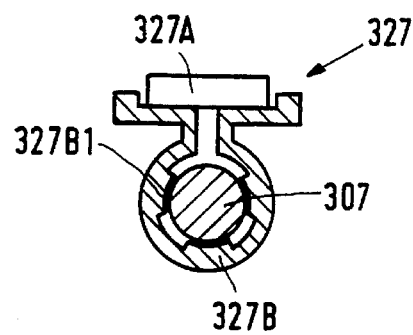
FIG. 3A is a sectional view of a pan of the embodiment shown in FIG. 3.

The device in accordance with the invention shown in FIGS. 3 and 3A has a frame 301 carrying a turntable 303 for rotating an optical disc-shaped information carrier 319. The device further comprises a slide 309 with an objective 311 and an actuator. The slide 309 is mechanically coupled to a linear motor unit 317 which can be energized to provide the desired movement of the slide. In the inoperative condition a holding device 326 serves for holding the slide 309 continuously and in the operative condition for holding this slide when no movements are performed. The holding device 326 has a clamping unit 327 constructed as a piezoelectric element and secured to the slide 309, which unit comprises a clamping actuator 327A and a clamping member 327B, and one of the guide spindles, i.e. the guide spindle 307. The clamping member 327B has three clamping surfaces 327B for cooperation with the circumferential surface of the guide spindle 307. When the clamping actuator 327A is not energized the clamping member 327B is clamped on the guide spindle 307 and the slide cannot be moved.

When the clamping actuator 327A is energized it is subjected to a length variation, causing the clamping member 327B to be deformed and to release the guide spindle, so that the slide is freely movable when the clamping actuator is energized.

Figure 4:
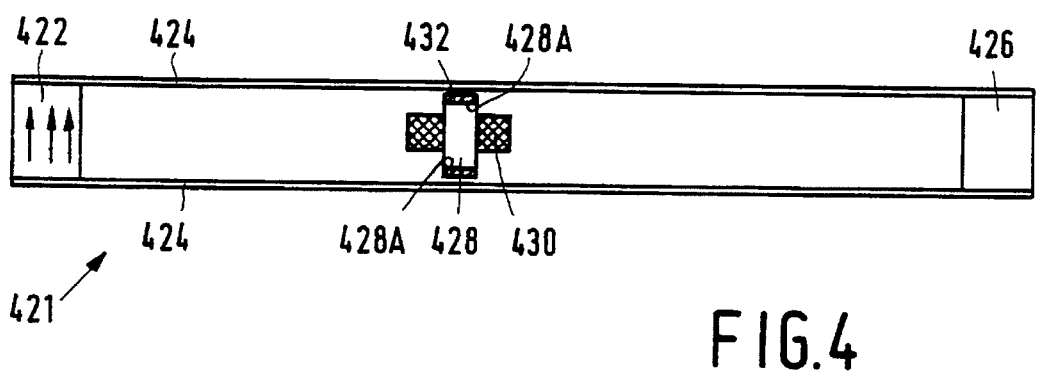
FIG. 4 shows a diagrammatically a clamping element of a fourth embodiment.

The clamping unit 42 1 shown in FIG. 4 is an alternative for the clamping units described elsewhere in the present description. The clamping unit 421 has a magnetic circuit comprising a first circuit section with a permanent magnet 422 and two parallel flexible strips 424 of a soft-magnetic material. A non-magnetic connecting element 426 is arranged opposite the magnet. A second circuit section comprises a core 428 with a coil 430 situated between the strips 424.

When the clamping unit 421 is used one of the circuit sections is secured to the frame and the other circuit section, for example the core 428 with the coil 430, is secured to the slide, the strips 424 being oriented in such a manner that their longitudinal axes extend parallel to the path of the slide. When the coil 430 is not energized magnetic forces clamp the strips 424 against the end surfaces 428 of the core 428, which surfaces are preferably provided with a lining 432. This is possible in any position of the slide if the strips have a suitable length. When the coil 430 is energized a counteracting magnetic field of adequate strength is generated to form an air gap between the core 428 and the strips 224.

Figures 5, 5A:
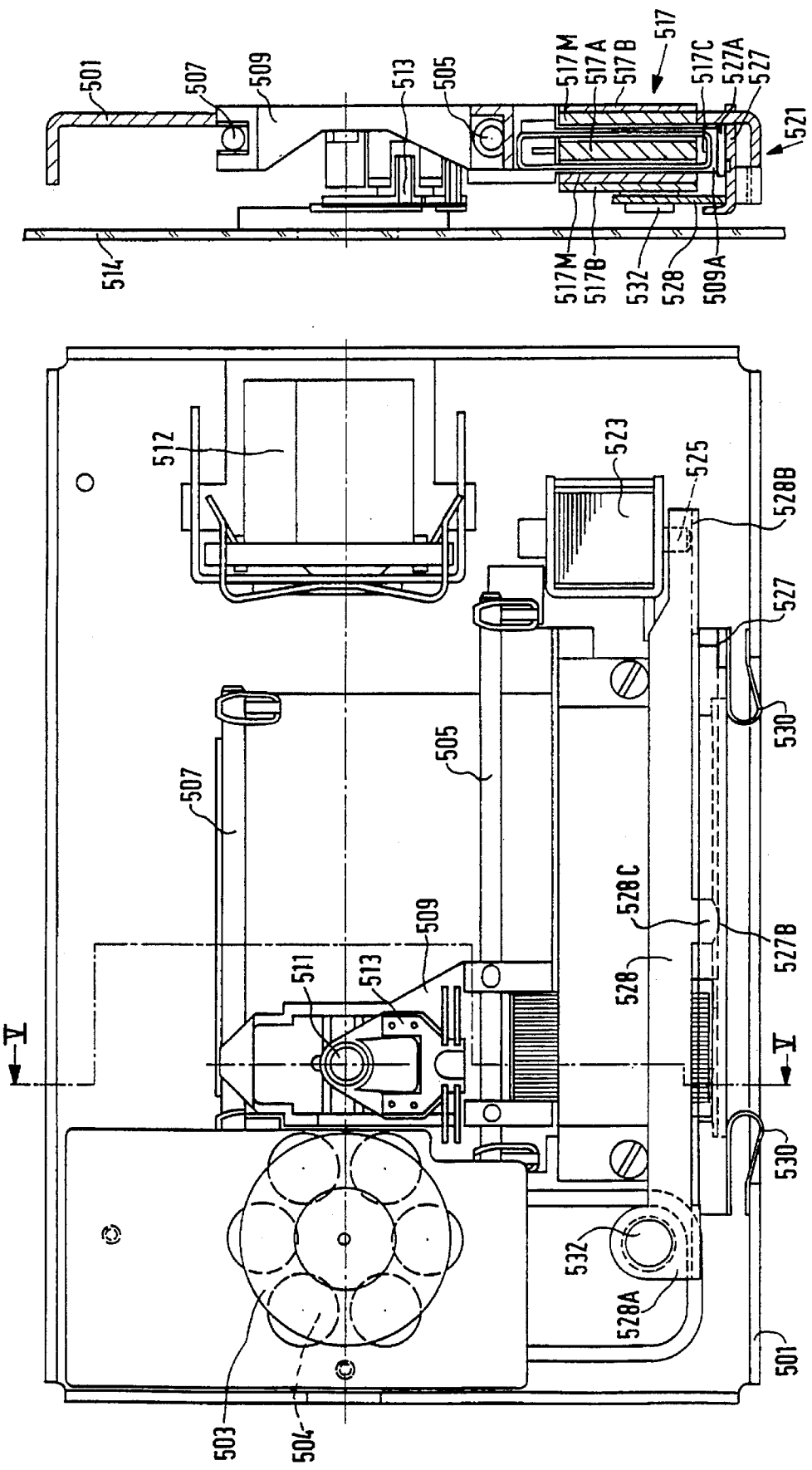
FIG. 5 is a plan view of a fifth embodiment.
FIG. 5A is a sectional view taken on the line V—V in FIG. 5.

The device in accordance with the invention shown in FIGS. 5 and 5A comprises a frame 501 accommodating a rotary motor 504 with a shaft carrying a turntable 503 with a supporting surface for an optically or magneto-optically inscribable and optically readable disc-shaped information carrier 514. The device has rectilinear guide means comprising two guide rods 505 and 507 for guiding a slide 509. The slide carries inter alia an actuator 513 and an objective 511 which forms part of an optical system and which can be driven by the actuator. The frame 501 carries a laser unit 512, which in operation emits a laser beam towards the slide. During operation a linear motor 517 moves the slide 509 stepwise over the rectilinear guide means. The linear motor 517 has a stator section which is secured to the frame 501 and which comprises two permanent magnets 517M, a soft-magnetic core 517A and linkage plates 517B. An armature section comprising an energizing coil 517C is fixedly secured to the slide 509.

The embodiment shown in FIGS. 5 and 5A further comprises a holding device for retaining the slide 509 in any position along the rectilinear guide means. The holding device has a clamping unit 521 comprising a solenoid 523 mounted in the frame 501, an actuating spindle 525 which can be driven by the solenoid, a clamping element 527, and a lever 528. The strip-shaped clamping element 527, which is suspended from the frame 501 by means of two springs, in particular blade springs 530, extends parallel to the guide rods 505 and 507. The lever 528 is pivotally connected to the frame 505 at one end 528A and cooperates with the actuating spindle 525 at another end 528B. A central portion 528C of the lever 528 is pressed against a central portion 527B of the clamping element 527, which precludes an impermissible deformation of the clamping element and hence a delayed release of the slide.

When the solenoid 523 is not energized the clamping element 527 is clamped against a contact surface 509A of the slide 509 by the spring force provided by the springs 530. The clamping element 527 may be provided with a fining or coating. When the solenoid 523 is energized the actuating spindle 525 has moved so far out of the solenoid that, as a result of a pivotal movement of the lever 528 about a spindle 532, the clamping element 527 has performed a lateral translation relative to the slide 509 against the action of the springs 530, so that the clamping action is cancelled and the slide 509 is freely movable.

A control system for the above constructions will now be described with reference to FIG. 6. The control system comprises a control unit I comprising a computing device with a memory, for example a microprocessor μP, for switching on and switching off a first energizing current $i_1$ to the linear motor unit coupled to the slide and for switching on and switching off a second energizing current $i_2$ to the clamping unit. The slide, the motor unit and the clamping unit bear the references S, M and B respectively in FIG. 6. The control unit I comprises two power amplifiers $I_1$ and $I_2$.

During operation the position a of the radiation spot is dictated by the position of the slide S driven by the motor unit M and the position of the movable objective-carrying section of the 2D or 3D actuator (A in FIG. 6) relative to the slide. A signal related to the position a is supplied to an electro-optical unit II, which also receives a signal related to the position b of the information-carrier track being followed. The unit II derives a measurement signal from the difference between positions a and b, which signal in the form of a voltage u controls the actuator A via a controller III for fine control of the tracking.

During tracking a displacement sensor, not shown, generates a signal c which is related to the radial excursion of the movable section of the actuator A relative to a nominal value and which is applied to the microprocessor μP. The microprocessor compares the signal c with a programmed threshold value and thus derives control signals for the amplifiers $I_1$ and $I_2$. This means that the currents $i_1$ and $i_2$ appear only briefly during tracking, i.e. only when the threshold value is exceeded. Consequently, the device in accordance with the invention does not require much power.

Preferably, the control unit I is set in such a manner that the second energizing current $i_2$ the clamping unit B is turned on just before the first energizing current $i_1$ to the motor unit M at the beginning of a displacement of the slide. The time difference may be a few milliseconds. At the end of the displacement the first energizing current is preferably switched off before the second energizing current.

Since the microprocessor μP can lock the function of the control unit I to the scanning function of the device it is possible to prevent displacements of the slide S being performed during recording and/or reading. This means that an optimum protection of the slide is obtained against extraneous accelerating forces, for example as a result of shocks.

It is to be noted that the device in accordance with the invention does not require a closed control loop including the motor unit M, the slide S, the frame and the information carrier. This has the advantage that any parasitic resonances in the construction of the device cannot lead to instabilities during tracking.

Moreover, it is to be noted that during a search operation when the scanning spot is moved from one track of the information carrier to a specified other track of the information carrier the clamping unit is obviously energized to allow free movement of the slide.

Finally, it is to be noted that the invention is not limited to the embodiments shown and described herein by way of example. It is obvious that further embodiments are possible within the scope of the invention.

We claim:

1. An apparatus for inscribing and/or reading a rotating information carrier, comprising a frame carrying a turntable for supporting the information carrier, which turntable is rotatable about an axis of rotation, a slide which is movable along a path between two end positions and carries a scanning unit, a rectilinear guide means for the slide, arranged on the frame, a linear motor unit having a stator section fixedly secured to the frame and an armature section fixedly secured to the slide, and holding means for retaining the slide in an end position relative to the frame while the apparatus is in an inoperative condition, said holding means comprising a holding device and a control unit, characterized in that said holding means is arranged for holding the slide while the apparatus is in an operative condition and the slide is not being moved, the holding device comprises an electrically energizable clamping unit which
a) in the non-energized condition clamps the slide, with the armature section of the linear motor unit fixedly secured thereto, in any arbitrary position of the slide along said path, and
b) in the energized condition does not clamp the slide and the armature section which is fixedly secured thereto, and while said apparatus is in said operative condition said control unit turns on a first energizing current to the motor unit and a second energizing current, separate from said first energizing current, to the clamping unit at the beginning of a displacement of the slide along the guide means, said second energizing current being turned on substantially simultaneously with said first energizing current; and said control unit turns off the first energizing current and the second energizing current at the end of the displacement, said second energizing current being turned off substantially simultaneously with said first energizing current.

2. An apparatus as claimed in claim 1, further comprising a control system for controlling the apparatus, characterized in that said control unit comprises elements, responsive to signals from said control system, which determine the turn-on and turn-off instants for said energizing currents.

3. An apparatus as claimed in claim 1, characterized in that the clamping unit comprises a solenoid secured to the frame with an actuating mechanism and an elongate clamping element which is resiliently supported in the frame, which extends parallel to the path of the slide and which cooperates with the actuating mechanism, the clamping element being pressed against a contact portion of the slide when the solenoid is not energized and the clamping element being clear of the contact portion when the solenoid is energized.

4. An apparatus as claimed in claim 3, characterized in that the actuating mechanism comprises a lever which is pivotable about a spindle secured to the frame and which is in contact with a central portion of the clamping element when the solenoid is energized.

5. An apparatus as claimed in claim 3, characterized in that the clamping element is provided with a lining at a side facing the contact surface.

6. An apparatus as claimed in claim 1, characterized in that the clamping unit comprises a magnetic circuit having a first circuit section comprising a permanent magnet with two mutually parallel elongate soft-magnetic parts extending parallel to the path of the slide and having a second circuit section comprising a coil which is situated between the soft-magnetic parts and comprises a core, one of the circuit sections being secured to the frame and the other circuit section to the slide and at least one of the soft-magnetic parts being clamped against an end surface of the core by magnetic attraction when the coil is not energized and both soft-magnetic parts being clear of the core when the coil is energized.

7. An apparatus as claimed in claim 6, characterized in that at least one of the soft-magnetic parts is a flexible strip.

8. An apparatus as claimed in claim 6, characterized in that the soft-magnetic parts are interconnected at one end by a non-magnetizable connecting element.

9. An apparatus as claimed in claim 6, characterized in that the end surface of the core is provided with a lining.

10. An apparatus as claimed in claim 1, characterized in that the clamping unit comprises a piezoelectric element with a clamping actuator and with at least one clamping member, and a rod element, one of the elements being secured to the frame and the other element to the slide, the rod element being clamped by the clamping element when the clamping actuator is not energized and the rod element not being clamped by the clamping member when the clamping actuator is energized.

11. An apparatus as claimed in claim 10, characterized in that the rod element is of circular cross-section, the clamping member being coaxial with the rod element and being formed with clamping surfaces.

12. An apparatus as claimed in claim 11, characterized in that the piezoelectric element is secured to the slide and the rod element forms part of the guide means of the slide.

13. An apparatus as claimed in claim 1, characterized in that the clamping unit comprises a solenoid, which is secured to the frame and has a plunger to be driven by the solenoid, and a clamping element which is pivotably supported in the frame and which cooperates with the plunger, the clamping element being-pivotable about a pivotal axis parallel to the path of the slide and the clamping element being pressed against a contact surface of the slide when the solenoid is not energized and the clamping element not being in contact with the contact surface when the solenoid is energized.

14. An apparatus for inscribing and/or reading a rotating information carrier, comprising a frame carrying a turntable for supporting the information carrier, which turntable is rotatable about an axis of rotation, a slide which is movable along a path between two end positions and carries a scanning unit, a rectilinear guide means for the slide, arranged on the frame, a linear motor unit having a stator section fixedly secured to the frame and an armature section fixedly secured to the slide, and holding means for retaining the slide in an end position relative to the frame while the apparatus is in an inoperative condition, said holding means comprising a holding device and a control unit, characterized in that said holding means is arranged for holding the slide while the apparatus is in an operative condition and the slide is not being moved, the holding device comprises an electrically energizable clamping unit which
a) in the non-energized condition clamps the slide, with the armature section of the linear motor unit fixedly secured thereto, in any arbitrary position of the slide along said path, and
b) in the energized condition does not clamp the slide and the armature section which is fixedly secured thereto, and while said apparatus is in said operative condition said control unit turns on a first energizing current to the motor unit and a second energizing current, separate from said first energizing current, to the clamping unit at the beginning of a displacement of the slide along the guide means, said second energizing current being turned on substantially simultaneously with but just before said first energizing current; and said control unit turns off the first energizing current and the second energizing current at the end of the displacement, said second energizing current being turned off substantially simultaneously with said first energizing current.

15. An apparatus as claimed in claim 14, further comprising a control system for controlling the apparatus, characterized in that said control unit comprises elements, responsive to signals from said control system, which determine the turn-on and turn-off instants for said energizing currents.

16. An apparatus as claimed in claim 15, characterized in that at the end of said displacement of the slide said first energizing current is switched off before said second energizing current.

17. An apparatus as claimed in claim 15, characterized in that said control unit forms part of an actuator control system which further comprises a controller for an actuator of the scanning unit.

18. An apparatus for inscribing and/or reading a rotating information carrier, comprising

- a frame carrying a turntable for supporting the information carrier, which turntable is rotatable about an axis of rotation,
- a slide which is movable along a path between two end positions and carries a scanning unit,
- a rectilinear guide means for the slide, arranged on the frame,
- a linear motor unit having a stator section fixedly secured to the frame and an armature section fixedly secured to the slide, and
- a holding device for retaining the slide in an end position relative to the frame, characterized in that the holding device comprises an electrically energizable clamping unit which a) comprises a solenoid having a movable actuating element, and secured to the frame; a blade spring secured to the frame and cooperating with the actuating element; and a strip secured to the slide and extending between the solenoid and the blade spring and parallel to the path of the slide, b) in the non-energized condition clamps the slide, with the armature section of the linear motor unit fixedly secured thereto, in any arbitrary position of the slide along said path; said strip being clamped between the blade spring and the solenoid or a part of the frame when the solenoid is not energized, and c) in the energized condition does not clamp the slide and the armature section which is fixedly secured thereto; said strip being clear of the solenoid, the frame and the blade spring when the solenoid is energized, and said holding device further comprises a control unit which during operation of the device at least substantially simultaneously turns on a first energizing current to the motor unit and a second energizing current, separate from said first energizing current, to the clamping unit at the beginning of a displacement of the slide along the guide means; and which at least substantially simultaneously turns off the first energizing current and the second energizing current at the end of the displacement.

19. An apparatus as claimed in claim 18, characterized in that the strip is flexible.

20. An apparatus as claimed in claim 18, characterized in that the blade spring is provided with a lining.

\* \* \* \* \*